US011808858B2

(12) United States Patent
Meng et al.

(10) Patent No.: US 11,808,858 B2
(45) Date of Patent: Nov. 7, 2023

(54) SYSTEMS AND METHODS FOR CONSTRUCTING AND UTILIZING FIELD-OF-VIEW (FOV) INFORMATION

(71) Applicant: Pony AI Inc., Grand Caymans (KY)

(72) Inventors: Pingfan Meng, Dublin, CA (US); Yubo Zhang, Los Gatos, CA (US); Wei-Yang Chiu, Fremont, CA (US); Stephen Lee, Sunnyvale, CA (US)

(73) Assignee: Pony AI Inc., Grand Cayman (KY)

( * ) Notice: Subject to any disclaimer, the term of this patent is extended or adjusted under 35 U.S.C. 154(b) by 554 days.

(21) Appl. No.: 16/560,910

(22) Filed: Sep. 4, 2019

(65) Prior Publication Data

US 2021/0064943 A1   Mar. 4, 2021

(51) Int. Cl.
| | | |
|---|---|---|
| *G06F 16/00* | (2019.01) | |
| *G06F 7/00* | (2006.01) | |
| *G01S 17/931* | (2020.01) | |
| *G06F 16/29* | (2019.01) | |
| *G01S 17/89* | (2020.01) | |
| *G06F 16/172* | (2019.01) | |
| *G06V 30/262* | (2022.01) | |
| *G06V 20/56* | (2022.01) | |
| *G06V 10/80* | (2022.01) | |

(52) U.S. Cl.
CPC ............ *G01S 17/931* (2020.01); *G01S 17/89* (2013.01); *G06F 16/172* (2019.01); *G06F 16/29* (2019.01); *G06V 10/803* (2022.01); *G06V 10/806* (2022.01); *G06V 20/56* (2022.01); *G06V 30/274* (2022.01)

(58) Field of Classification Search
CPC ....... G06F 16/172; G06F 16/29; G06V 20/56; G06V 30/274; G06V 10/806; G06V 10/803; G01S 17/89; G01S 17/931
USPC ........................................................ 707/736
See application file for complete search history.

(56) References Cited

U.S. PATENT DOCUMENTS

| | | |
|---|---|---|
| 5,555,503 A | 9/1996 | Kyrtsos et al. |
| 9,373,149 B2 | 6/2016 | Abhyanker |
| 2013/0332060 A1* | 12/2013 | Chowdhary ......... G06Q 10/087 701/300 |
| 2014/0143783 A1* | 5/2014 | Bose ....................... G06F 1/324 718/102 |
| 2017/0039765 A1* | 2/2017 | Zhou .......................... G06T 7/55 |
| 2017/0060624 A1* | 3/2017 | Prosch .................. G06F 9/5088 |
| 2017/0251339 A1* | 8/2017 | Addepalli ............... G06F 3/167 |
| 2017/0310948 A1 | 10/2017 | Pei et al. |

(Continued)

*Primary Examiner* — Raquel Perez-Arroyo

(57) ABSTRACT

Described herein are systems, methods, and non-transitory computer readable media for constructing and utilizing vehicle field-of-view (FOV) information. The FOV information can be utilized in connection with vehicle localization such as localization of an autonomous vehicle (AV), sensor data fusion, or the like. A customized computing machine can be provided that is configured to construct and utilize the FOV information. The customized computing machine can utilize the FOV information, and more specifically, FOV semantics data included therein to manage various data and execution patterns relating to processing performed in connection with operation of an AV such as, for example, data prefetch operations, reordering of sensor data input streams, and allocation of data processing among multiple processing cores.

19 Claims, 7 Drawing Sheets

(56) References Cited

U.S. PATENT DOCUMENTS

2018/0307238 A1* 10/2018 Wisniowski ............ G01S 17/86
2020/0192603 A1*  6/2020 Tanriover ................ G06F 9/466

* cited by examiner

SYSTEMS AND METHODS FOR CONSTRUCTING AND UTILIZING FIELD-OF-VIEW (FOV) INFORMATION

The present invention relates generally to the construction and utilization of FOV information, and more particularly, in some embodiments, to the utilization of FOV semantics information to manage various data and execution tasks including data prefetch operations, data processing reordering operations, and adaptive allocation of data processing to computing cores.

BACKGROUND

On-board sensors in a vehicle, such as an autonomous vehicle (AV), supplement and bolster the vehicle's FOV by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors can be broadly categorized into two types: active sensors that provide their own energy source for operation and passive sensors that rely on an external power source for operation. On-board sensors include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

Various technologies exist for determining the location of a vehicle such as an AV. Such technologies include, for example, traditional GPS devices as well as IMU-enabled GPS devices that allow a GPS receiver to work when GPS-signals are unavailable such as in tunnels, inside buildings, or when electronic interference is present. These technologies, however, suffer from a number of drawbacks. Technical solutions that address these drawbacks as well as technical drawbacks associated with other AV-related processing such as sensor fusion are described herein.

SUMMARY

Described herein are systems, methods, and non-transitory computer readable media for constructing and utilizing FOV information. In an example embodiment, the FOV information may be utilized in connection with vehicle localization such as localization of an AV, sensor data fusion, or the like. In an example embodiment, a customized computing machine is provided that is configured to construct and utilize the FOV information. The customized computing machine may be implemented on any suitable device including, without limitation, a field-programmable gate array (FPGA), an application-specific integrated circuit (ASIC), or the like. In example embodiments, the customized computing machine may utilize the FOV information, and more specifically, FOV semantics data to manage various data and execution patterns relating to processing performed in connection with operation of an AV such as, for example, data prefetch operations, reordering of sensor data input streams, and allocation of data processing among multiple processing cores.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
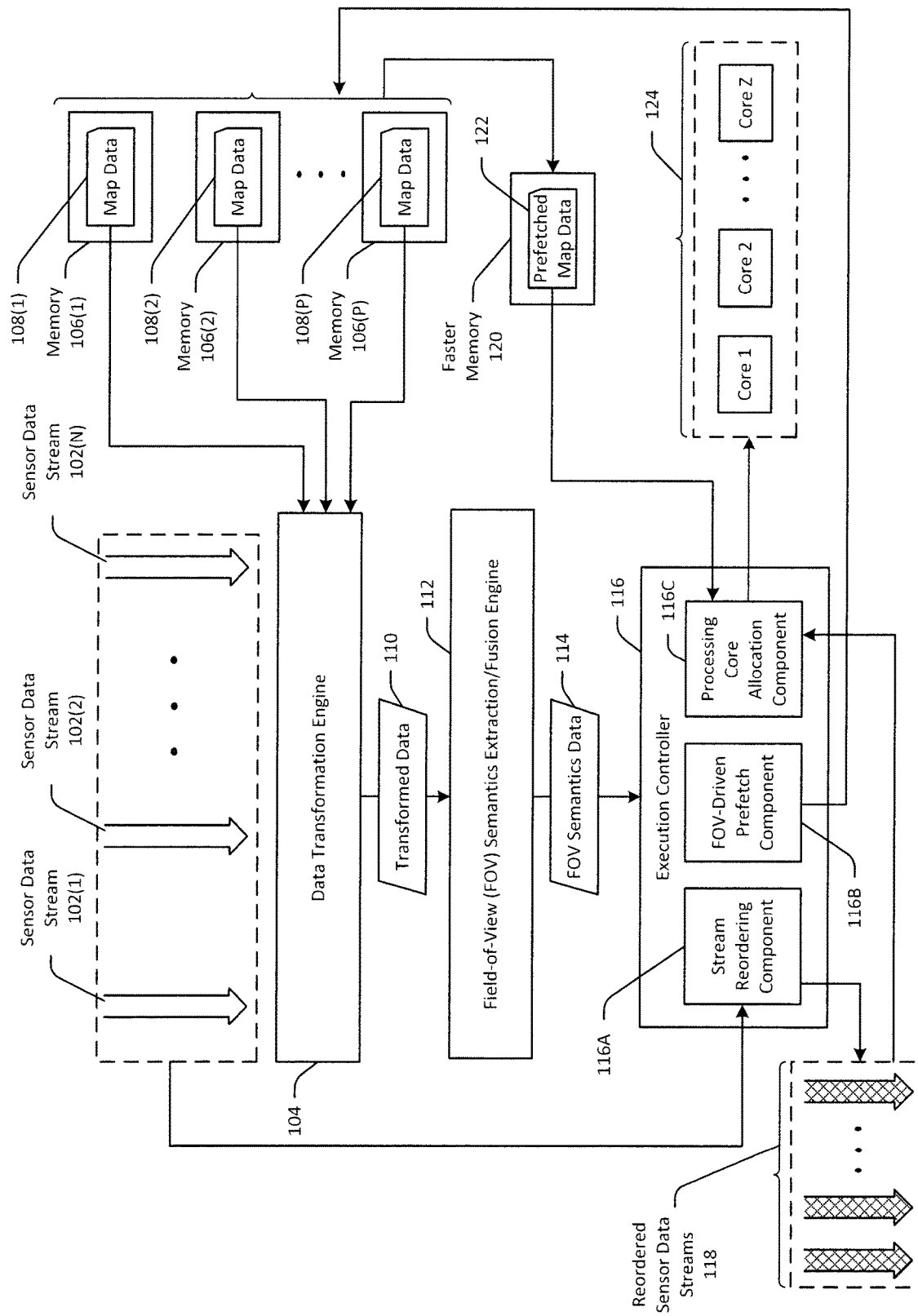
FIG. 1 is a hybrid data flow and block diagram illustrating operation of a customized FOV semantics computing machine in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous or driverless vehicle. For example, LiDARs can be utilized to detect and identify objects (e.g., other vehicles, road signs, pedestrians, buildings, etc.) in an environment around a vehicle. LiDARs can also be utilized to determine relative distances of the objects in the environment. As another non-limiting example, radars can be utilized in connection with collision avoidance, adaptive cruise control, blind spot detection, assisted parking, and so forth. As yet another non-limiting example, cameras can be utilized to recognize, interpret, and/or identify objects captured in images or visual cues of the objects. Cameras and other optical sensors can capture image data using charge coupled devices (CCDs), complementary metal oxide semiconductors (CMOS), or similar elements. As still another non-limiting example, an IMU may detect abnormal road surface conditions or obstructions such as a bump or pothole in a road. Data collected from these sensors can be processed and used, as inputs, to algorithms configured to make various autonomous driving decisions including decisions relating to when and the extent to which to accelerate, decelerate, change direction, or the like. For example, data from such sensors may be further processed into an image histogram of a graphical representation of tonal distribution in a captured image.

Various embodiments overcome technical problems specifically arising in the realm of computer-based technology, more specifically autonomous vehicle technology, and even more specifically, computer-based technology relating to data processing and data analytics performed in connection with the operation of an autonomous vehicle. In various example embodiments of the invention, the myriad of sensors previously described (e.g., LiDARs, radars, cameras, etc.) provide continuous streams of input sensor data that can be used in conjunction with pre-populated data such as map data to construct FOV semantics data relating to a vehicle's FOV. In an example embodiment, the FOV semantics data may then be utilized in connection with various AV processing tasks such as vehicle localization, sensor data fusion, or the like. More specifically, in example embodiments, the constructed FOV semantics data can be used to manage various data and execution patterns associated with such AV processing tasks including, for example, data prefetch operations, reordering of sensor data input streams, and allocation of data processing among multiple processing cores.

In an example embodiment, a customized computing machine is provided that is configured to construct and utilize the FOV semantics data. The customized computing machine may be implemented on any suitable device including, without limitation, an FPGA, an ASIC, or the like. The customized computing machine may include customized logic for receiving, as input, continuous sensor data input streams from various sensors on-board a vehicle as well as pre-populated data such as map data, and performing one or more data transformation operations on the input. The map data may be static data that is gathered and updated periodically offline. In example embodiments, the map data may be retrieved from hard disk storage or other memory having a relatively slow access rate. The data transformation operation(s) may include transforming the sensor data input streams and the pre-populated map data partially or entirely into a unified coordinate system. In example embodiments, the pre-populated data may already have a unified coordinate system, and the customized logic may transform the sensor data input streams into that same unified coordinate system.

Once all data adheres to the same unified coordinate system, customized logic of the computing machine may be executed to extract spatial and temporal semantics data for FOVs of the vehicle. In example embodiments, the FOV of a vehicle may be represented by the spatial distribution of the sensor data streams (i.e., where sensors are scanning) and the temporal distribution of the sensor data streams (i.e., when sensors are scanning). Spatial FOV semantics data for a particular FOV may indicate the location of the FOV within the unified coordinate system. Temporal FOV semantics data for a particular FOV may indicate at which point in time sensors would provide data representative of the FOV. In example embodiments, once FOV semantics data is extracted, data fusion may be performed on the data.

In example embodiments, the computing machine may utilize the potentially fused FOV semantics data to manage various AV processing tasks. In particular, in example embodiments, the computing machine may include an execution controller that manages data and execution patterns based on the FOV semantics data. For instance, the execution controller may reorder sensor data input streams based on the FOV semantics data. In example embodiments, reordering the sensor data input streams may prevent multiple processing cores from attempting to access the same portion of the pre-populated map data simultaneously, thereby reducing computational latency and improving computational performance. According to example embodiments, data prefetch is another example optimization that may be performed using the FOV semantics data. In particular, the execution controller may be configured to perform FOV-driven data prefetch by retrieving those portions of map data corresponding to a FOV represented in FOV semantics data from slower access data storage (e.g., hard disk storage) and storing the retrieved portions of the map data in faster access data storage such as static random access memory (SRAM) or cache memory. In example embodiments, FOV-driven data prefetch increases computational speed by reducing the latency associated with accessing the stored map data, and thereby improves computational performance.

In example embodiments, the customized computing machine is further configured to utilize the FOV semantics data to optimize the allocation of processing to various processing cores. For instance, in example embodiments, the execution controller is configured to perform processing core allocation in conjunction with the sensor data input stream reordering to maximize the extent to which map data can be processed in parallel by multiple processing cores while still ensuring that multiple cores do not attempt to access the same portion of the map data at the same time. In addition, in example embodiments, the execution controller may be configured to execute an optimization according to which different vertical sensor scans (e.g., from different LiDAR sensors or the same LiDAR sensor) and their corresponding motion compensation data are allocated for processing to different processing cores. Thus, in example embodiments, while processing of a first vertical sensor scan is still ongoing on a first processing core, processing of a second vertical sensor scan (even if from the same sensor) can begin on a second processing core without the latency that would occur if the processing were to be performed sequentially on the same processing core. In this manner, computational latency is reduced and computational performance is enhanced. In addition, in example embodiments, the execution controller may be configured to allocate all frames of a sensor scan (e.g., the multiple beams in one vertical LiDAR scan) to a parallel data path in a processing core and store the shared motion compensation data in an on-core buffer. According to this optimization, the shared motion compensation data is stored only once in connection with processing of the sensor scan, and does not need to be recalculated and stored multiple times, as would be the case if different frames of the same sensor scan were allocated to different processing cores. As such, this optimization of example embodiments of the invention also reduces computational latency and improves computational performance.

Each of the above-described data processing optimizations—which will be described more fully later in this disclosure—constitute technical improvements over conventional data processing in connection with AV operation, and thus, constitute improvements to computer technology, and more specifically, improvements to autonomous vehicle technology. In particular, such optimizations represent technical solutions to technical problems associated with conventional data processing and data analytics performed in connection with AV operation.

Figure 5:
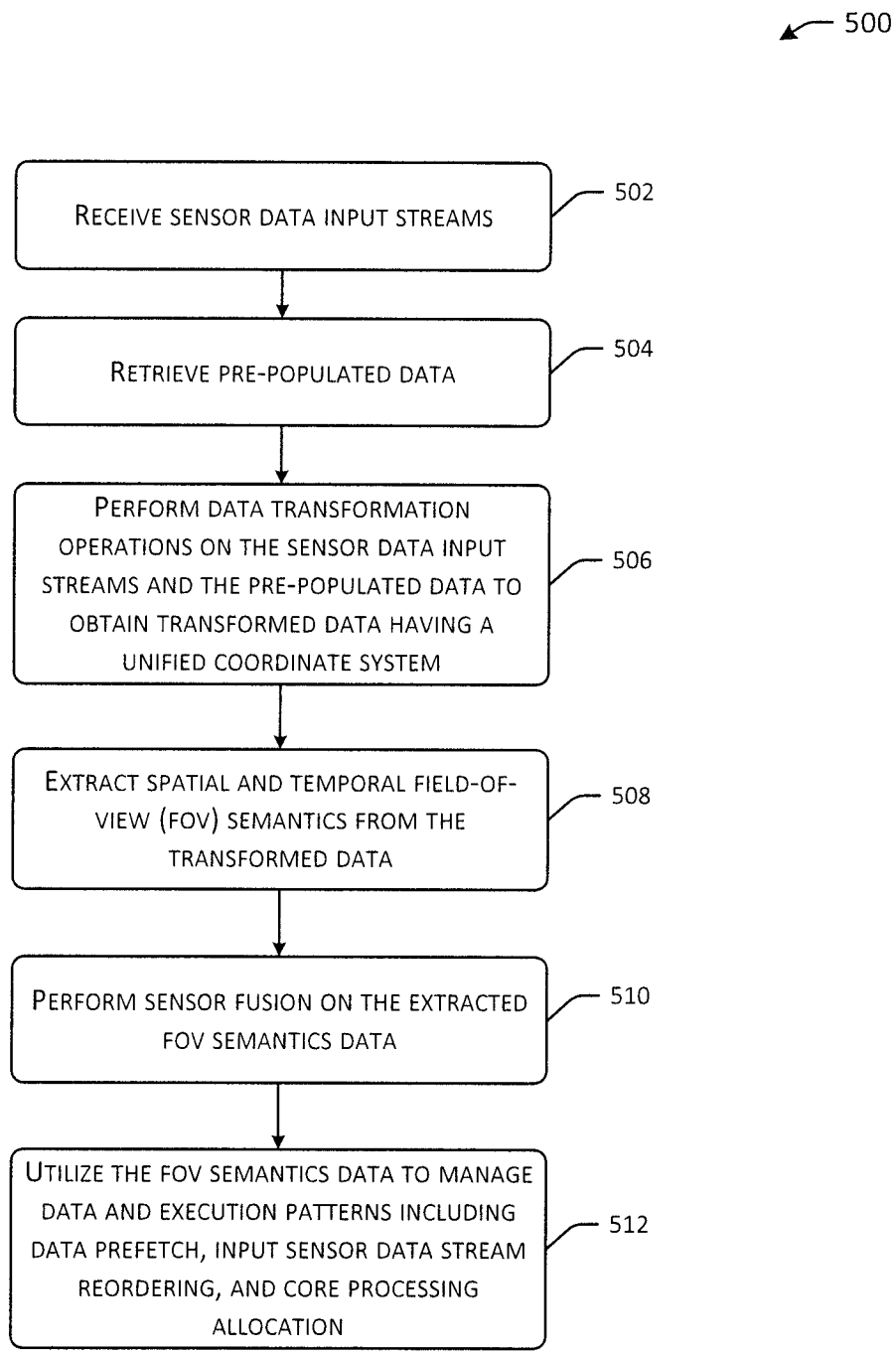
FIG. 5 is a process flow diagram of an illustrative method for performing data transformation operations on input sensor data and pre-populated data; extracting FOV semantics from the transformed data; and utilizing the extracted FOV semantics to manage data and execution patterns in accordance with an example embodiment of the invention.

FIG. 1 is a hybrid data flow and block diagram illustrating operation of a customized FOV semantics computing machine in accordance with an example embodiment of the invention. FIG. 5 is a process flow diagram of an illustrative method 500 for performing data transformation operations on input sensor data and pre-populated data; extracting FOV semantics from the transformed data; and utilizing the extracted FOV semantics to manage data and execution patterns in accordance with an example embodiment of the invention. FIGS. 1 and 5 will be described in conjunction with one another hereinafter.

Each operation of any method described herein can be performed by one or more of the engines/program modules depicted in FIG. 1 or FIG. 7, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 1, various components of a customized FOV semantics computing machine are depicted. In example embodiments, the FOV semantics computing machine may include customized logic in the form of a data transformation engine 104; customized logic in the form of an FOV semantics extraction/fusion engine 112; and customized logic in the form of an execution controller 116. In example embodiments, each of these customized pieces of logic may be implemented within the FOV semantics computing machine—which, as noted earlier, may be a customized computing device such as an FPGA or an ASIC—and may be configured to execute specialized tasks, which will be described in more detail hereinafter.

Referring now to FIG. 5 in conjunction with FIG. 1, at block 502 of the method 500, the customized FOV semantics computing machine may receive multiple sensor data input streams 102(1)-102(N) from a collection of on-board vehicle sensors, such as any of those previously described. More specifically, in example embodiments, the data transformation engine 104 may receive the sensor data input streams 102(1)-102(N) as continuous input stream data as various on-board vehicle sensors capture data from a vehicle's surrounding environment. Any given sensor data input stream may be referred to generically hereinafter as sensor data input stream 102, and N may represent any integer value greater than one.

At block 504 of the method 500, the data transformation engine 104 may retrieve pre-populated data such as stored static map data. While example embodiments of the invention may be described herein in connection with pre-populated data that is static map data, it should be appreciated that the pre-populated data can be any pre-populated data relating to a FOV of a vehicle. In example embodiments, portions of pre-populated data 108(1)-108(P) (e.g., map data) may be respectively stored in data storage 106(1)-106(P), where P is any integer greater than or equal to one. In example embodiments, the data storage 106(1)-106(P) may be data storage having a relatively slower data access rate such as hard disk storage or slow-access memory. Further, in certain example embodiments, the portions of the pre-populated data 108(1)-108(P) may each represent non-redundant portions of data, while in other example embodiments, different portions of the pre-populated data (e.g., map data 108(1) and map data 108(2)) may include at least some redundant data (e.g., a same portion of a static high-definition (HD) map). In example embodiments, the map data 108(1)-108(P) may be captured and stored offline and periodically updated at any suitable frequency. One or more portions of the pre-populated data 108(1)-108(P) may be referred to herein generically as pre-populated data 108 or map data 108.

At block 506 of the method 500, logic of the data transformation engine 104 may be executed to perform one or more data transformation operations on the sensor data input streams 102(1)-102(N) and the pre-populated map data 108(1)-108(P) to obtain transformed data 110. In example embodiments, the data transformation operation(s) may include, for example, complete or partial transformation of the sensor data input streams 102(1)-102(N) and the pre-populated map data 108(1)-108(P) to a unified 3D coordinate system. In certain example embodiments, the pre-populated map data 108(1)-108(P) may already be transformed into a unified coordinate system prior to being stored, in which case, the sensor data input streams 102(1)-102(N) may be transformed into the same coordinate system as the pre-populated map data 108(1)-108(P). In other example embodiments, both the pre-populated map data 108(1)-108(P) and the sensor data input streams 102(1)-102(N) may be transformed to a new unified coordinate system.

In certain example embodiments, the unified coordinate system may be a static coordinate system with a fixed coordinate center/reference frame or a dynamic coordinate system such as one in which a vehicle's instantaneous location serves as the center of the coordinate system. Further, in certain example embodiments, the data transformation engine 104 may also receive motion compensation data as additional input when determining the unified coordinate system in order to account for changes in the vehicle's position, and thus, changes to the frame of reference for the vehicle's FOV caused by road surface conditions or other vibrational characteristics. Still further, in certain example embodiments, the data transformation engine 104 may receive intrinsic and/or extrinsic calibration results for one or more sensors in order to account for deviations between sensors due to calibration errors when performing the data transformation to the unified coordinate system.

At block 508 of the method 500, the transformed data 110 in the unified coordinate system may be provided as input to the FOV semantics extraction/fusion engine 112, which may be configured to extract, from the transformed data 110, spatial and temporal FOV semantics in the form of FOV semantics data 114. In example embodiments, the FOV of a vehicle may be represented by the spatial distribution of the sensor data input streams 102(1)-102(N) (i.e., the physical environment being scanned by the sensors) and the temporal distribution of the sensor data input streams 102(1)-102(N) (i.e., the time periods over which the sensors are scanning). Spatial FOV semantics data for a particular FOV may indicate the location of the FOV within the unified coordinate system, and temporal FOV semantics data for a particular FOV may indicate at which point in time sensors would provide data representative of the FOV.

Figure 2:
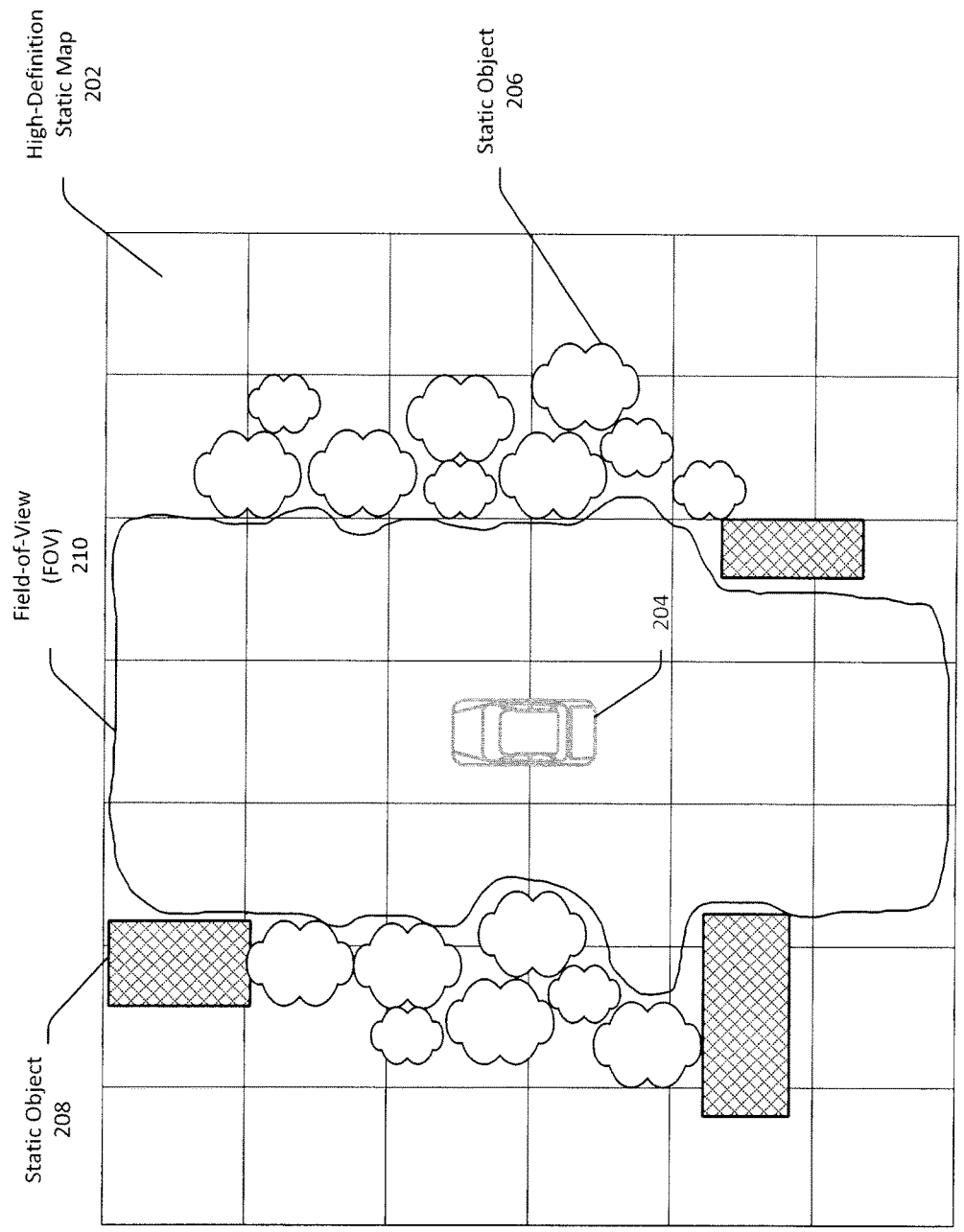
FIG. 2 illustrates an example FOV in relation to a high-definition static map in accordance with an example embodiment of the invention.

FIG. 2 illustrates an example FOV in relation to a high-definition static map in accordance with an example embodiment of the invention. As depicted in FIG. 2, an FOV 210 of a vehicle 204 at a given point in time may be dictated by the presence of various objects present within a surrounding environment of the vehicle 204. For instance, various sensors on-board the vehicle 204 (e.g., LiDAR sensors, radar, etc.) may detect the presence of static objects such as static object 208 (e.g., a physical structure such as a building) and static object 206 (e.g., an environmental object such as a tree) that may, in example embodiments, define an irregular shape for the FOV 210. Further, while not depicted in FIG. 2, in example embodiments, on-board sensors of the vehicle 204 may further detect the presence of various objects within the FOV 210 (e.g., pedestrians, other vehicles, road obstructions, etc.).

Referring again to FIG. 5 in conjunction with FIG. 1, at block 510 of the method 500, the FOV semantics extraction/fusion engine 112 may execute logic to perform data fusion on the extracted FOV semantics data 114. Sensor data fusion may be performed to provide semantic meaning to the sensor data input streams 102(1)-102(N). As a non-limiting example, a first sensor data input stream (e.g., 102(1)) may represent data captured by a LiDAR sensor. The data may be representative of an object detected at a certain height above a road surface. A second sensor data input stream (e.g., 102(2)) may represent image data captured by a camera. The FOV semantics extraction/fusion engine 112 may be configured to fuse the first sensor data input stream and the second sensor data input stream to determine that the object detected by the LiDAR sensor is a traffic light.

In other example embodiments, sensor data fusion may include data interpolation. For instance, in certain example scenarios, there may be portions of the surrounding environment of a vehicle that are not fully detected/captured by the collection of on-board sensors on the vehicle. In such example scenarios, the FOV semantics extraction/fusion engine 112 may be configured to perform data interpolation to compensate for any sensor data that may be absent from the sensor data input streams 102(1)-102(N) due to gaps in coverage of the environment by the collection of on-board sensors. In addition, in other example embodiments, sensor data fusion may include eliminating data redundancy in the sensor data input streams 102(1)-102(N). For instance, multiple on-board vehicle sensors may capture sensor data corresponding to overlapping regions of the surrounding environment of the vehicle. In such example scenarios, some of the data captured by such sensors may be redundant. This data redundancy can be eliminated without any loss in the FOV semantics that can be derived from the sensor data input streams 102(1)-102(N).

At block 512 of the method 500, an execution controller 116 of the customized computing machine may utilize the FOV semantics data 114 to manage data and execution patterns for AV-related data processing tasks such as data prefetch, sensor data input stream reordering, and processing core allocation. More specifically, the execution controller 116 may include various components configured to manage respective data and execution patterns including a stream reordering component 116A, an FOV-driven prefetch component 116B, and a processing core allocation component 116C.

In example embodiments, the FOV-driven prefetch component 116B may be configured to perform data prefetch of the map data 108. More specifically, the FOV-driven prefetch component 116B may retrieve one or more portions of the map data 108(1)-108(P) from corresponding slower access data storage 106(1)-106(P) and store the prefetched map data 122 in faster access data storage 120. As previously noted, the slower access data storage 106(1)-106(P) may be hard disk storage or the like and the faster access data storage 120 may be SRAM, cache memory, or the like. In example embodiments, the prefetched map data 122 may be provided as input to the processing core allocation component 116C which may, in turn, allocate the prefetched map data 122 to one or more of the processing cores 124 for processing. In certain example embodiments, the faster access data storage 120 may include one or more caches that are shared among two or more of the processing cores 124 and/or a respective cache for each of one or more of the processing cores 124.

In example embodiments, the stream reordering component 116A may be configured to reorder one or more of the sensor data input streams 102(1)-102(N) to obtain reordered sensor data input streams 118. The reordering performed by the stream reordering component 116A may include altering the sequence of data frames in one or more of the sensor data input streams 102(1)-102(N). In example embodiments, the reordered sensor data input streams 118 may be provided as input to the processing core allocation component 116C which, in turn, may allocate data of the reordered streams 118 to one or more of the processing cores 124. Further, as described above, the processing core allocation component 116C may also allocate corresponding map data 108 to the one or more processing cores such that the sensor input data can be matched to the map data 108 with the vehicle FOVs aligned.

Referring again to FIG. 2, in example embodiments, the map data 108 may take the form of an HD static map 202 having a grid-based structure. More specifically, in example embodiments, each grid element in the grid structure may have a designated size that encompasses a corresponding portion of a mapped environment. In example embodiments, the map data 108 can be fetched and allocated to one or more of the processing cores 124 on a grid element-by-grid element basis. Thus, in certain scenarios, all map data represented by a grid element may be fetched for processing even though the FOV 210 only includes a portion of the map data represented by that grid element.

In example embodiments, the granularity of the grid structure can be varied. For instance, the granularity of the grid structure of the HD static map 202 can be increased such that each grid element becomes smaller in size and encompasses a smaller portion of the mapped environment. In this manner, a more precise prefetch of the map data can be performed. In particular, as the size of each grid element decreases, map data 108 corresponding to fewer grid elements may need to be prefetched and stored as the prefetched map data 122 in order to fully capture the portions of the HD static map 202 encompassed by the FOV 210. Thus, the data prefetch performed by the FOV-driven data prefetch component 116B can be optimized by providing a more granular grid structure that does not require prefetch of those portions of the map data 108 not required to be processed for the FOV 210. This is particularly advantageous in example scenarios in which the FOV has an irregular shape such as example FOV 210.

Referring again to FIG. 1, in example embodiments, the stream reordering component 116A may perform the stream reordering in order to mitigate or eliminate simultaneous requests for the same portion of the map data 108 from multiple processing cores. More specifically, in example embodiments, the stream reordering component 116A may reorder the sensor data input streams 102(1)-102(N) to produce the reordered sensor data streams 118 and allocate data frames of the reordered sensor data streams 118 to various processing cores of the collection of processing cores 124 in a manner that mitigates or entirely prevents multiple processing cores from accessing the same portion of the map data 108 (e.g., the same portion of the prefetched map data 122) when processing the sensor data in conjunction with the map data. As such, processing latency is reduced and processing performance is enhanced because a processing core does not need to wait to access map data while another processing core is accessing the same map data.

Figure 3:
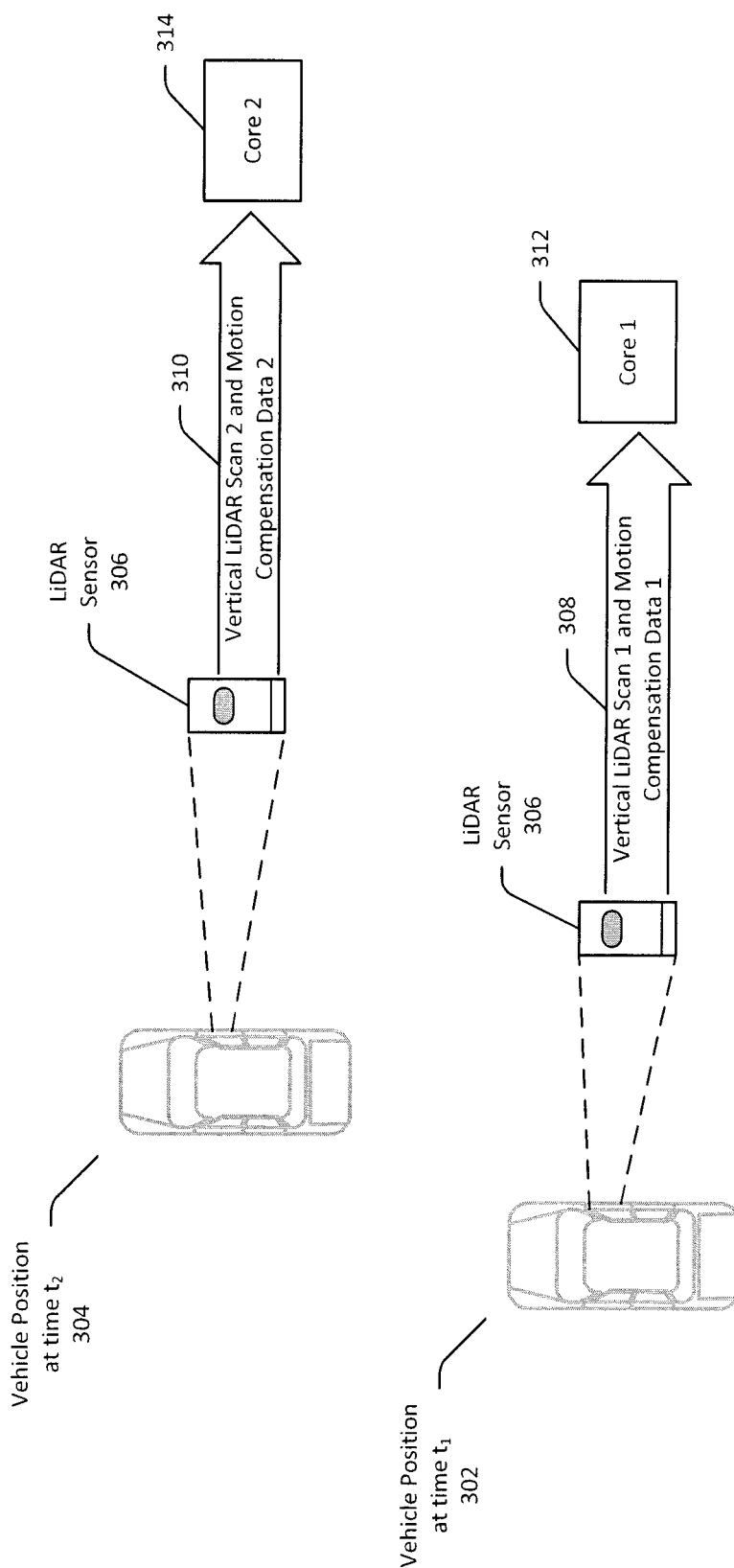
FIG. 3 illustrates allocation of distinct vertical sensor scans and corresponding motion compensation data to different processing cores in accordance with an embodiment of the invention.
Figure 6:
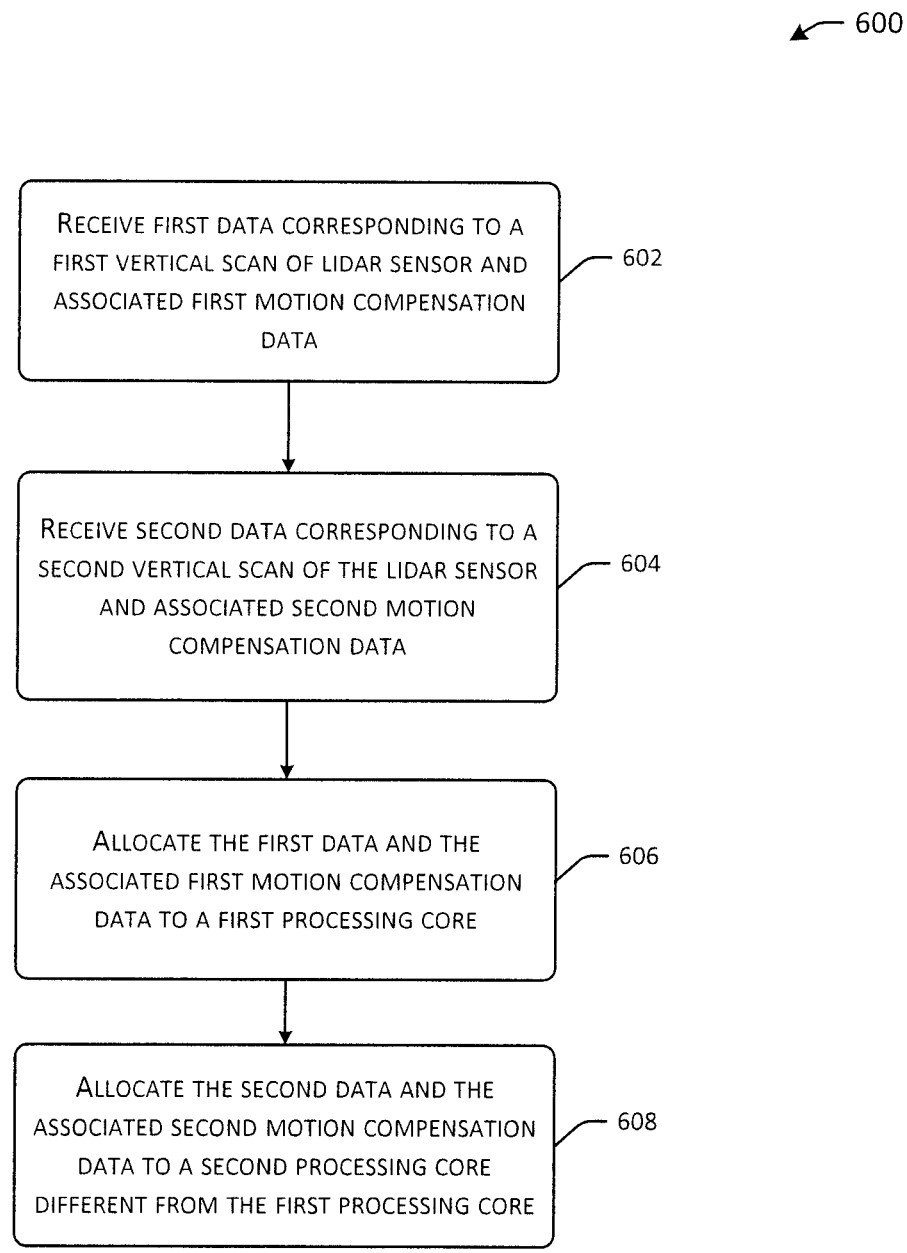
FIG. 6 is a process flow diagram of an illustrative method for allocating distinct vertical sensor scans and corresponding motion compensation data to different processing cores in accordance with an embodiment of the invention.

In example embodiments, the processing core allocation component 116C may be configured to perform various optimizations with respect to how sensor data and/or map data is allocated to the processing cores 124. FIG. 6 is a process flow diagram of an illustrative method 600 for performing one such optimization, in particular, the allocation of distinct vertical sensor scans and corresponding motion compensation data to different processing cores. FIG. 3 schematically illustrates the allocation of distinct vertical sensor scans and corresponding motion compensation data to different processing cores. FIGS. 3 and 6 will be described in conjunction with one another hereinafter.

At block 602 of the method 600, the customized FOV semantics computing machine may receive first data 308 corresponding to a first vertical sensor scan and associated first motion compensation data. In example embodiments, the first vertical sensor scan may be a vertical scan performed by a LiDAR sensor 306 when a vehicle is in a first position 302 at time $t_1$. The first motion compensation data may reflect deviations in the position of vehicle during the first vertical sensor scan. In example embodiments, the first vertical sensor scan data and associated first motion compensation data 308 may be received as part of a corresponding continuous sensor data input stream (e.g., sensor data input stream 108(1)) and may first be transformed to a unified coordinate system along with corresponding map data 108 prior to being provided as input to the processing core allocation component 116C, as previously described. In addition, FOV semantics data 114 may be extracted from the data 308 and sensor data fusion potentially performed thereon, as previously described, prior to the processing core allocation component 116C allocating the data 308 for processing by one or more of the processing cores 124.

At block 604 of the method 600, the customized FOV semantics computing machine may receive second data 310 corresponding to a second vertical sensor scan and associated second motion compensation data. The second motion compensation data may reflect deviations in the position of vehicle during the second vertical sensor scan. In example embodiments, the second vertical sensor scan may be a vertical scan performed by the same LiDAR sensor 306 that performed the first vertical scan, but when the vehicle is in a second position 304 at time $t_2$. In other example embodiments, the first and second sensor scans may be performed by different on-board sensors. Similar to the first vertical sensor scan, the second vertical sensor scan data and associated second motion compensation data 310 may be received as part of a corresponding continuous sensor data input stream (e.g., sensor data input stream 108(2)) and may first be transformed to a unified coordinate system along with corresponding map data 108 prior to being provided as input to the processing core allocation component 116C, as previously described. In addition, FOV semantics data 114 may be extracted from the data 310 and sensor data fusion potentially performed thereon, as previously described, prior to the processing core allocation component 116C allocating the data 310 for processing by one or more of the processing cores 124.

At block 606 of the method 600, the processing core allocation component 116C may allocate the first vertical scan data and associated first motion compensation data 308 to a first processing core 312 of the collection of processing cores 124. At block 608 of the method 600, the processing core allocation component 116C may allocate the second vertical scan data and associated second motion compensation data 310 to a second processing core 314 of the collection of processing cores 124. By allocating the first vertical sensor scan data and associated first motion compensation data 308 to a different processing core than the second vertical sensor scan data and associated second motion compensation data 310, computational latency is reduced because processing of the second vertical scan data and associated second motion compensation data 310 can be initiated, if necessary, by the second processing core 314 prior to completion of processing performed by the first processing core 312.

Figure 4:
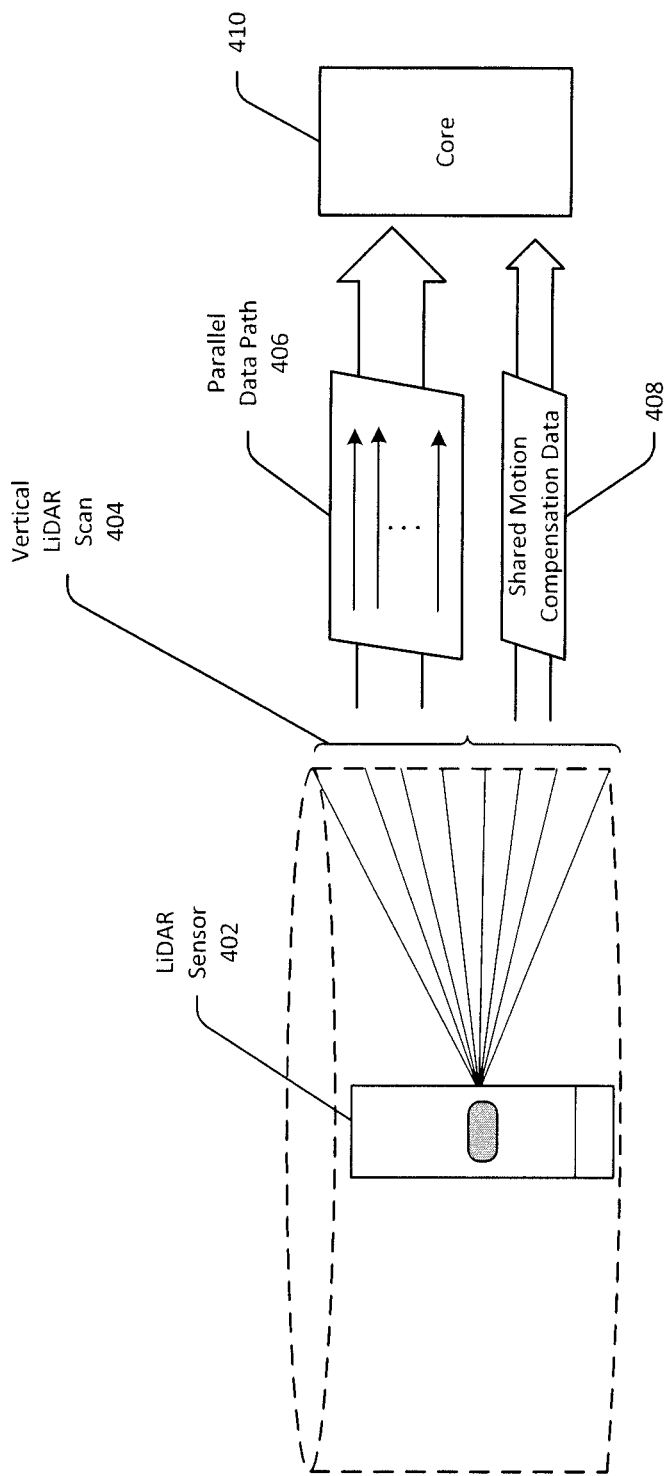
FIG. 4 illustrates allocation of all frames of a vertical sensor scan and corresponding motion compensation data to a same processing core to improve computing performance and reduce computational redundancy in accordance with an example embodiment of the invention.

FIG. 4 depicts yet another optimization that may be performed by the processing core allocation component 116C. In particular, FIG. 4 illustrates allocation of all frames of a vertical sensor scan and corresponding motion compensation data to a same processing core to improve computing performance and reduce computational redundancy in accordance with an example embodiment of the invention. As depicted in FIG. 4, a sensor 402 (e.g., a LiDAR sensor) may perform a vertical sensor scan 404. The vertical sensor scan 404 may include multiple sensor data frames, where each data frame includes data corresponding to a portion of the vertical scan. In example embodiments, the processing core allocation component 116C may issue each data frame of the vertical scan 404 to a parallel data path 406 that is allocated to a processing core 410. In addition, the processing core allocation component 116C may store shared motion compensation data 408 for the vertical scan 404 in an on-core buffer of the processing core 410. By assigning all data frames of the vertical sensor scan 404 and corresponding shared motion compensation data 408 to the same processing core 410, computational latency is reduced and computational performance is enhanced because processing of each data frame in the parallel data path 406 can rely on the same shared motion compensation data 408 stored in the on-core buffer.

Hardware Implementation

Figure 7:
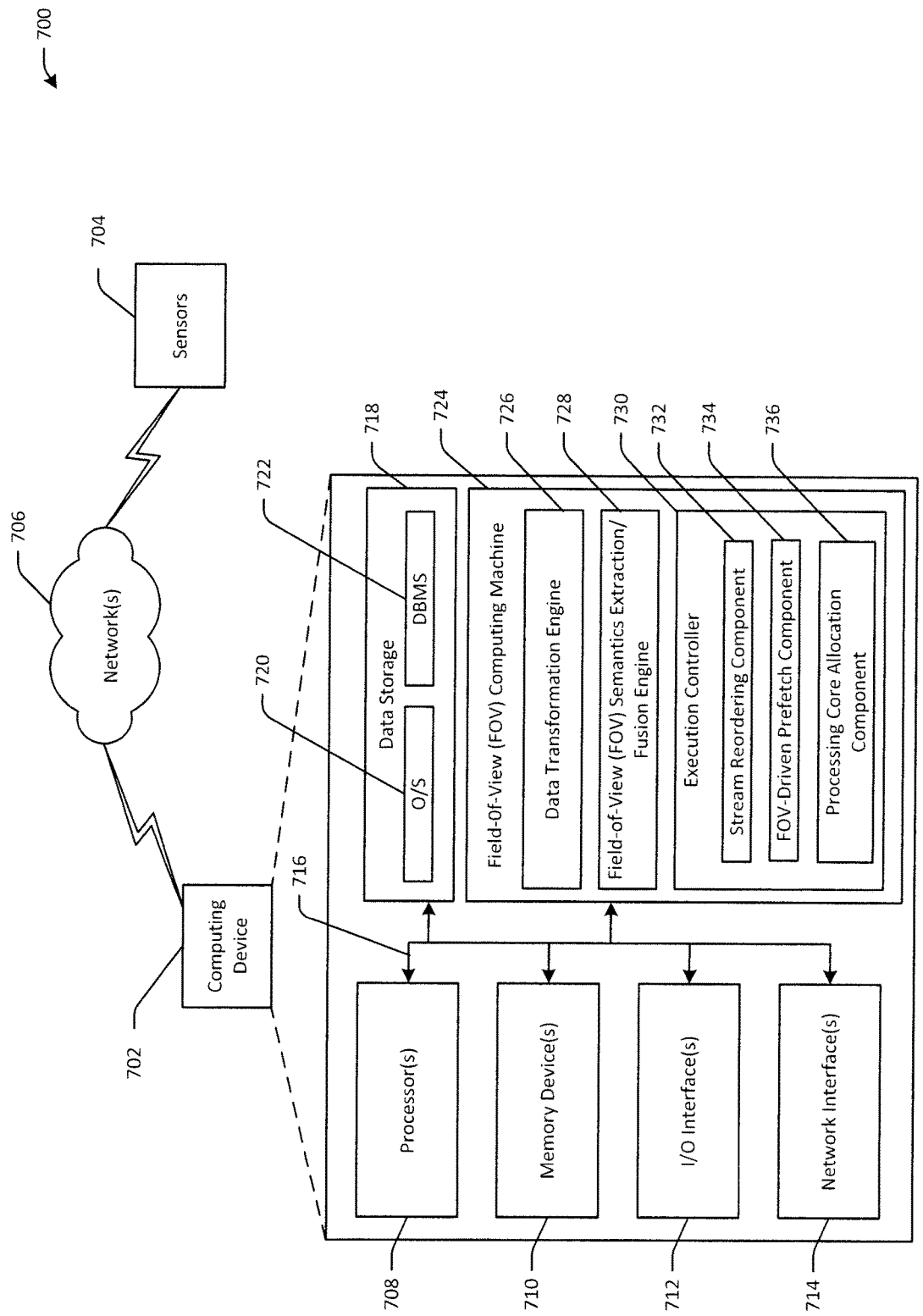
FIG. 7 is a schematic block diagram illustrating an example networked architecture configured to implement example embodiments of the invention.

FIG. 7 is a schematic block diagram illustrating an example networked architecture 700 configured to implement example embodiments of the invention. The networked architecture 700 can include one or more special-purpose computing devices 702 communicatively coupled via one or more networks 706 to various sensors 704. The sensors 704 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 704 may include on-board sensors provided on an exterior or in an interior of a vehicle such as an autonomous vehicle. However, in certain example embodiments, the sensors 704 may also include one or more fixed sensors provided in a physical environment surrounding a vehicle. The special-purpose computing device(s) 702 may include devices that are integrated with a vehicle and may receive sensor data (e.g., the sensor data input streams 102(1)-102(N) depicted in FIG. 1) from the sensors 704 via a local network connection (e.g., WiFi, Bluetooth, Dedicated Short Range Communication (DSRC), or the like). In other example embodiments, the special-purpose computing device(s) 702 may be provided remotely from a vehicle and may receive the sensor data from the sensors 704 via one or more long-range networks.

The special-purpose computing device(s) 702 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 702 may also combine custom hard-wired logic, ASICs, or FPGAs with custom programming to accomplish the techniques. The special-purpose computing device(s) 702 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 720, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 702 may be controlled by a proprietary operating system. The operating system software 720 may control and schedule computer processes for execution; perform memory management; provide file system, networking, and I/O services; and provide user interface functionality, such as a graphical user interface ("GUI").

While the computing device(s) 702 and/or the sensors 704 may be described herein in the singular, it should be appreciated that multiple instances of any such component can be provided and functionality described in connection any particular component can be distributed across multiple instances of such a component. In certain example embodiments, functionality described herein in connection with any given component of the architecture 700 can be distributed among multiple components of the architecture 700. For example, at least a portion of functionality described as being provided by a computing device 702 may be distributed among multiple such computing devices 702.

The network(s) 706 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 706 can have any suitable communication range associated therewith and can include, for example, global networks (e.g., the Internet), metropolitan area networks (MANs), wide area networks (WANs), local area networks (LANs), or personal area networks (PANs). In addition, the network(s) 706 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 702 can include one or more processors (processor(s)) 708, one or more memory devices 710 (generically referred to herein as memory 710), one or more input/output ("I/O") interface(s) 712, one or more network interfaces 714, and data storage 718. The computing device 702 can further include one or more buses 716 that functionally couple various components of the computing device 702. The computing device 702 may also include a customized FOV semantics computing machine 724 that may include various engines/components such as a data transformation engine 726, an FOV semantics extraction/fusion engine 728, and an execution controller 732. The execution controller 732 may, in turn, include a stream reordering component 732, an FOV-driven prefetch component 734, and a processing core allocation component 736. Each of the engines/components of the FOV semantics computing machine 724 may include logic for performing any of the processes and tasks described earlier in connection with correspondingly named engines/components depicted in FIG. 1. In example embodiments, the FOV semantics computing machine 724 may include hard-wired circuitry for performing corresponding techniques and/or circuitry or digital electronic devices such as one or more ASICs or FPGAs that are persistently programmed to perform such techniques.

The bus(es) 716 can include at least one of a system bus, a memory bus, an address bus, or a message bus, and can permit the exchange of information (e.g., data (including computer-executable code), signaling, etc.) between various components of the computing device 702. The bus(es) 716 can include, without limitation, a memory bus or a memory controller, a peripheral bus, an accelerated graphics port, and so forth. The bus(es) 716 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 710 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 710 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 710 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 710 may include the data storage 106(1)-106(P) and/or the data storage 120 depicted in FIG. 1. Alternatively, the data storage 106(1)-106(P) may be hard disk storage forming part of the data storage 718 and/or the data storage 120 may be a form of RAM or cache memory that is provided as part of the FOV semantics computing machine 724 itself.

The data storage 718 can include removable storage and/or non-removable storage including, but not limited to, magnetic storage, optical disk storage, and/or tape storage. The data storage 718 can provide non-volatile storage of computer-executable instructions and other data. The memory 710 and the data storage 718, removable and/or non-removable, are examples of computer-readable storage media (CRSM) as that term is used herein. The data storage 718 can store computer-executable code, instructions, or the like that can be loadable into the memory 710 and executable by the processor(s) 708 to cause the processor(s) 708 to perform or initiate various operations. The data storage 718 can additionally store data that can be copied to memory 710 for use by the processor(s) 708 during the execution of the computer-executable instructions. Moreover, output data generated as a result of execution of the computer-executable instructions by the processor(s) 708 can be stored initially in memory 710 and can ultimately be copied to data storage 718 for non-volatile storage.

More specifically, the data storage 718 can store one or more operating systems (O/S) 720 and one or more database management systems (DBMS) 722 configured to access the memory 710 and/or one or more external datastore(s) (not depicted) potentially via one or more of the networks 706. In addition, the data storage 718 may further store one or more program modules, applications, engines, computer-executable code, scripts, or the like. For instance, any of the engines/components depicted in FIG. 7 as forming part of the FOV semantics computing machine 724 may be implemented as software and/or firmware that includes computer-executable instructions (e.g., computer-executable program code) loadable into the memory 710 for execution by one or more of the processor(s) 708 to perform any of the techniques described herein.

Although not depicted in FIG. 7, the data storage 718 can further store various types of data utilized by engines/components of the computing device 702, or more specifically, by engines/components of the FOV semantics computing machine 724. Such data may include, without limitation, sensor data, map data, FOV semantics data, or the like. Any data stored in the data storage 718 can be loaded into the memory 710 for use by the processor(s) 708 in executing computer-executable program code. In addition, any data stored in the data storage 718 can potentially be stored in one or more external datastores that are accessible via the DBMS 722 and loadable into the memory 710 for use by the processor(s) 708 in executing computer-executable instructions/program code.

The processor(s) 708 can be configured to access the memory 710 and execute computer-executable instructions/program code loaded therein. For example, the processor(s) 708 can be configured to execute computer-executable instructions/program code of the various engines/components of the FOV semantics computing machine 724 to cause or facilitate various operations to be performed in accordance with one or more embodiments of the invention. The processor(s) 708 can include any suitable processing unit capable of accepting data as input, processing the input data in accordance with stored computer-executable instructions, and generating output data. The processor(s) 708 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 708 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 708 can be made capable of supporting any of a variety of instruction sets.

Referring now to other illustrative components depicted as being stored in the data storage 718, the O/S 720 can be loaded from the data storage 718 into the memory 710 and can provide an interface between other application software executing on the computing device 702 and hardware resources of the computing device 702. More specifically, the O/S 720 can include a set of computer-executable instructions for managing hardware resources of the computing device 702 and for providing common services to other application programs. In certain example embodiments, the O/S 720 can include or otherwise control execution of one or more of the engines/program modules stored in the data storage 718. The O/S 720 can include any operating system now known or which can be developed in the future including, but not limited to, any server operating system, any mainframe operating system, or any other proprietary or non-proprietary operating system.

The DBMS 722 can be loaded into the memory 710 and can support functionality for accessing, retrieving, storing, and/or manipulating data stored in the memory 710, data stored in the data storage 718, and/or data stored in external datastore(s). The DBMS 722 can use any of a variety of database models (e.g., relational model, object model, etc.) and can support any of a variety of query languages. The DBMS 722 can access data represented in one or more data schemas and stored in any suitable data repository. Datastore(s) that may be accessible by the computing device 702 via the DBMS 722, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 702, the input/output (I/O) interface(s) 712 can facilitate the receipt of input information by the computing device 702 from one or more I/O devices as well as the output of information from the computing device 702 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 702 or can be separate therefrom. The I/O devices can further include, for example, any number of peripheral devices such as data storage devices, printing devices, and so forth.

The I/O interface(s) 712 can also include an interface for an external peripheral device connection such as universal serial bus (USB), FireWire, Thunderbolt, Ethernet port or other connection protocol that can connect to one or more networks. The I/O interface(s) 712 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 702 can further include one or more network interfaces 714 via which the computing device 702 can communicate with any of a variety of other systems, platforms, networks, devices, and so forth. The network interface(s) 714 can enable communication, for example, with the sensors 704 and/or one or more other devices via one or more of the network(s) 706. In example embodiments, the network interface(s) 714 provide a two-way data communication coupling to one or more network links that are connected to one or more of the network(s) 706. For example, the network interface(s) 714 may include an integrated services digital network (ISDN) card, a cable modem, a satellite modem, or a modem to provide a data communication connection to a corresponding type of telephone line. As another non-limiting example, the network interface(s) 714 may include a local area network (LAN) card to provide a data communication connection to a compatible LAN (or a wide area network (WAN) component to communicate with a WAN). Wireless links may also be implemented. In any such implementation, the network interface(s) 714 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 704 and the signals on network links and through the network interface(s) 714, which carry the digital data to and from the computing device 702, are example forms of transmission media. In example embodiments, the computing device 702 can send messages and receive data, including program code, through the network(s) 706, network links, and network interface(s) 714. For instance, in the Internet example, a server might transmit a requested code for an application program through the Internet, the ISP, a local network, and a network interface 714. The received code may be executed by a processor 708 as it is received, and/or stored in the data storage 718, or other non-volatile storage for later execution.

It should be appreciated that the engines/components depicted in FIG. 7 as part of the computing device 702 are merely illustrative and not exhaustive and that processing described as being supported by any particular engine/component can alternatively be distributed across multiple engines, components, modules, or the like, or performed by a different engine, component, module, or the like. In addition, various program module(s), engine(s), script(s), plug-in(s), Application Programming Interface(s) (API(s)), or any other suitable computer-executable code hosted locally on the computing device 702 and/or hosted on other computing device(s) (e.g., a sensor 704) accessible via one or more of the network(s) 706, can be provided to support functionality provided by the engines/components depicted in FIG. 7 and/or additional or alternate functionality. Further, functionality can be modularized in any suitable manner such that processing described as being performed by a particular engine/component can be performed by a collection of any number of engines, components, program modules, or the like, or functionality described as being supported by any particular engine/component can be supported, at least in part, by another engine, component, or program module. In addition, engines/components that support functionality described herein can be executable across any number of computing devices 702 in accordance with any suitable computing model such as, for example, a client-server model, a peer-to-peer model, and so forth. In addition, any of the functionality described as being supported by any of the engines/components depicted in FIG. 7 can be implemented, at least partially, in hardware and/or firmware across any number of devices or servers.

It should further be appreciated that the computing device 702 can include alternate and/or additional hardware, software, or firmware components beyond those described or depicted without departing from the scope of the invention. More particularly, it should be appreciated that software, firmware, or hardware components depicted as forming part of the computing device 702 are merely illustrative and that some components may or may not be present or additional components can be provided in various embodiments. It should further be appreciated that each of the above-mentioned engines/components represents, in various embodiments, a logical partitioning of supported functionality. This logical partitioning is depicted for ease of explanation of the functionality and may or may not be representative of the structure of software, hardware, and/or firmware for implementing the functionality. Accordingly, it should be appreciated that functionality described as being provided by a particular engine/component can, in various embodiments, be provided at least in part by one or more other engines, components, or program modules. Further, one or more depicted engines/components may or may not be present in certain embodiments, while in other embodiments, additional engines/components not depicted can be present and can support at least a portion of the described functionality and/or additional functionality.

In general, the terms engine or program module, as used herein, refer to logic embodied in hardware or firmware, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

Example embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may comprise non-volatile media and/or volatile media. A non-exhaustive list of more specific examples of the computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from with transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory, however, can operate in conjunction with transmission media. In particular, transmission media participates in transferring information between non-transitory media. For example, transmission media includes coaxial cables, copper wire and fiber optics, including the wires that comprise at least some of the bus(es) 716. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A method for constructing and utilizing field-of-view (FOV) information, comprising:
   receiving a plurality of sensor data input streams from a plurality of sensors associated with a vehicle;
   retrieving a subset of pre-populated map data from a slower-access storage and transferring the subset to a faster-access storage, wherein the faster-access storage has a relatively higher data access rate;
   performing one or more data transformation operations on the sensor data input streams and the pre-populated data to obtain transformed data;
   extracting FOV semantics data from the transformed data, wherein the FOV semantics data comprises spatial and temporal data; and
   managing data and execution patterns utilizing the FOV semantics data, wherein the managing comprises:
     receiving, from different cores, requests for portions of the subset of the pre-populated map data, wherein each of the different cores requests a different portion of the subset of the pre-populated map data;
     allocating a computation of different frames of a first sensor scan to a common core based on a first reduction in latency resulting from retrieving motion compensation data corresponding to different frames of the first sensor scan from a common buffer of the common core, compared to retrieving the motion compensation data from different cores, wherein the motion compensation data corresponding to the different frames of the first sensor scan adjusts for changes in frames of reference of the sensor data input streams caused by road surface conditions and vibrations;
     allocating a computation of the first sensor scan and a second sensor scan to different cores based on a second reduction in latency from simultaneously computing different portions of the sensor data input streams, compared to computing only a single portion of the sensor data input streams at any specific time instance;

in response to allocating the computation of the first sensor scan and the second sensor scan to different cores, storing motion compensation data corresponding to the first sensor scan and the second sensor scan in each of the different cores; and in response to allocating the computation of the different frames to the common core, storing the motion compensation data corresponding to the different frames of the first sensor scan in the common buffer.

2. The method of claim 1, wherein the managing of the data and execution patterns further comprises performing data prefetch operations and reordering the sensor data input streams.

3. The method of claim 2, wherein the pre-populated data is map data, and wherein the performing the data prefetch operations comprises:

determining an FOV of the vehicle based at least in part on the FOV semantics data;

determining a portion of the map data corresponding to the FOV; and performing a prefetch of the portion of the map data, wherein performing the prefetch comprises retrieving the portion of the map data from a first data storage and storing the retrieved portion of the map data in a second data storage, wherein the second data storage has a faster access rate than the first data storage.

4. The method of claim 3, wherein the FOV of the vehicle has an irregular shape.

5. The method of claim 4, wherein the map data is associated with a grid size that permits retrieval of the portion of the map data corresponding to the irregular shape of the FOV of the vehicle.

6. The method of claim 2, wherein the reordering of the input-sensor data input streams comprises modifying a processing sequence of frames of the input-sensor data input streams to ensure that a portion of the map data is restricted to a single core.

7. The method of claim 1, further comprising performing sensor fusion on the extracted FOV semantics data.

8. The method of claim 7, wherein performing the sensor fusion comprises at least one of data interpolation or data redundancy elimination.

9. A computing machine for constructing and utilizing field-of-view (FOV) information, comprising:

a memory comprising instructions; and one or more processors configured to execute instructions to:

receive a plurality of sensor data input streams from a plurality of sensors associated with a vehicle;

retrieve a subset of pre-populated map data from a slower-access storage and transferring the subset to a faster-access storage, wherein the faster-access storage has a relatively higher data access rate; and perform one or more data transformation operations on the sensor data input streams and the pre-populated data to obtain transformed data;

extract FOV semantics data from the transformed data, wherein the FOV semantics data comprises spatial and temporal data; and manage data and execution patterns utilizing the FOV semantics data, wherein the managing comprises:

receiving, from different cores, requests for portions of the subset of the pre-populated map data, wherein each of the different cores requests a different portion of the subset of the pre-populated map data;

allocating a computation of different frames of a first sensor scan to a common core based on a first reduction in latency resulting from retrieving motion compensation data corresponding to different frames of the first sensor scan from a common buffer of the common core, compared to retrieving the motion compensation data from different cores, wherein the motion compensation data adjusts for changes in frames of reference of the sensor data input streams caused by road surface conditions and vibrations;

allocating a computation of the first sensor scan and a second sensor scan to different cores based on a second reduction in latency from simultaneously computing different portions of the sensor data input streams, compared to computing only a single portion of the sensor data input streams at any specific time instance;

in response to allocating the computation of the first sensor scan and the second sensor scan to different cores, storing motion compensation data corresponding to the first sensor scan and the second sensor scan in each of the different cores; and in response to allocating the computation of the different frames to the common core, storing the motion compensation data corresponding to the different frames of the first sensor scan in the common buffer.

10. The computing machine of claim 9, wherein the managing of the data and execution patterns further comprises performing data prefetch operations and reordering of the sensor data input streams.

11. The computing machine of claim 10, wherein the pre-populated data is map data, and wherein the performing the data prefetch operations comprises:

determining an FOV of the vehicle based at least in part on the FOV semantics data;

determining a portion of the map data corresponding to the FOV; and performing a prefetch of the portion of the map data, wherein performing the prefetch comprises retrieving the portion of the map data from a first data storage and storing the retrieved portion of the map data in a second data storage, wherein the second data storage has a faster access rate than the first data storage.

12. The computing machine of claim 11, wherein the FOV of the vehicle has an irregular shape.

13. The computing machine of claim 12, wherein the map data is associated with a grid size that permits retrieval of the portion of the map data corresponding to the irregular shape of the FOV of the vehicle.

14. The computing machine of claim 10, wherein the reordering of the sensor data input streams comprises modifying a processing sequence of frames of the sensor data input streams to ensure that a portion of the map data is restricted to a single core.

15. The computing machine of claim 9, wherein the one or more processors are further configured to execute instructions, which when executed, cause the one or more processors to perform sensor fusion on the extracted FOV semantics data.

16. A computer program product for constructing and utilizing field-of-view (FOV) information, the computer program product comprising a non-transitory computer-readable medium readable by a processing circuit, the non-transitory computer-readable medium storing instructions executable by the processing circuit to cause a method to be performed, the method comprising:

receiving a plurality of sensor data input streams from a plurality of sensors associated with a vehicle;

retrieving a subset of pre-populated map data from a slower-access storage and transferring the subset to a faster-access storage, wherein the faster-access storage has a relatively higher data access rate;

performing one or more data transformation operations on the sensor data input streams and the pre-populated data to obtain transformed data;

extracting FOV semantics data from the transformed data, wherein the FOV semantics data comprises spatial and temporal data; and managing data and execution patterns utilizing the FOV semantics data, wherein the managing comprises:

receiving, from different cores, requests for portions of the subset of the pre-populated map data, wherein each of the different cores requests a different portion of the subset of the pre-populated map data;

allocating a computation of different frames of a first sensor scan to a common core based on a first reduction in latency resulting from retrieving motion compensation data corresponding to the different frames of the first sensor scan from a common buffer of the common core, compared to retrieving the motion compensation data from different cores, wherein the motion compensation data corresponding to the different frames of the first sensor scan adjusts for changes in frames of reference of the sensor data input streams caused by road surface conditions and vibrations;

allocating a computation of the first sensor scan and a second sensor scan to different cores based on a second reduction in latency from simultaneously computing different portions of the sensor data input streams, compared to computing only a single portion of the sensor data input streams at any specific time instance;

in response to allocating the computation of the first sensor scan and the second sensor scan to different cores, storing motion compensation data corresponding to the first sensor scan and the second sensor scan in each of the different cores; and in response to allocating the computation of the different frames to the common core, storing the motion compensation data corresponding to the different frames of the first sensor scan in the common buffer.

17. The computer program product of claim 16, wherein the managing of the data and execution patterns further comprises performing data prefetch operations and reordering the sensor data input streams.

18. The computer program product of claim 17, wherein the pre-populated data is map data, and wherein the performing the data prefetch operations comprises:

determining an FOV of the vehicle based at least in part on the FOV semantics data;

determining a portion of the map data corresponding to the FOV; and performing a prefetch of the portion of the map data, wherein performing the prefetch comprises retrieving the portion of the map data from a first data storage and storing the retrieved portion of the map data in a second data storage, wherein the second data storage has a faster access rate than the first data storage.

19. The method of claim 1, wherein the subset of the map data corresponds to a field of view; wherein boundaries of the field of view are defined based on a first type of static object and a second type of static object such that a first portion of a boundary of the field of view coincides with a boundary of the first type of the static object and a second portion of the boundary of the field of view coincides with a boundary of the second type of the static object; and the field of view comprises grids, at least a portion of the grids having different sizes.

* * * * *